United States Patent
Ikemoto

(10) Patent No.: US 9,330,354 B2
(45) Date of Patent: *May 3, 2016

(54) RADIO IC DEVICE

(71) Applicant: Murata Manufacturing Co., Ltd., Nagaokakyo-shi, Kyoto-fu (JP)

(72) Inventor: Nobuo Ikemoto, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/721,127

(22) Filed: May 26, 2015

(65) Prior Publication Data

US 2015/0254548 A1 Sep. 10, 2015

Related U.S. Application Data

(63) Continuation of application No. 12/981,582, filed on Dec. 30, 2010, now Pat. No. 9,077,067, which is a continuation of application No. PCT/JP2009/062181, filed on Jul. 3, 2009.

(30) Foreign Application Priority Data

Jul. 4, 2008 (JP) .................. 2008-175460

(51) Int. Cl.
*H04Q 5/22* (2006.01)
*G08B 13/14* (2006.01)
(Continued)

(52) U.S. Cl.
CPC ...... *G06K 19/07786* (2013.01); *G06K 19/0701* (2013.01); *G06K 19/07749* (2013.01);
(Continued)

(58) Field of Classification Search
CPC ............... G06K 19/0724; G06K 19/07749; G06K 19/07767; G06K 19/07779; G06K 19/07783; G06K 19/07786; G06K 19/07756; G06K 19/07769; G06K 7/10178; G06K 19/0675; G06K 19/0723; G06K 19/07771; G08B 13/2417; G08B 13/2448; H01Q 1/2225; H01Q 7/00
USPC ............... 340/10.1, 572.7, 572.5, 10.51, 5.8, 340/539.21, 572.4; 343/853, 855, 867, 728, 343/751; 235/492, 493, 449; 310/365
See application file for complete search history.

(56) References Cited

U.S. PATENT DOCUMENTS 6,378,774 B1 * 4/2002 Emori et al. .................. 235/492
6,744,367 B1 * 6/2004 Forster ............... G06K 19/0675
310/313 R
(Continued)

OTHER PUBLICATIONS

Ikemoto, "Radio IC Device", U.S. Appl. No. 12/981,582, filed Dec. 30, 2010.

*Primary Examiner* — Mirza Alam
(74) *Attorney, Agent, or Firm* — Keating & Bennett, LLP

(57) ABSTRACT

A radio IC device that can be used in a plurality of frequency bands for RFID tags and that is compact and has superior radiation characteristics is provided. A spiral line electrode portion and a first side electrode, extending from an inner end thereof, of a capacitor electrode portion are provided on a top surface of a sheet-shaped substrate, and a second side electrode arranged to face the first side electrode and a crossing line electrode are provided on a bottom surface of the substrate. A first radio IC chip is arranged at a location in the line electrode portion, and a second RFID tag radio IC is arranged so as to be connected to a front-to-back connection portion and an end of an electric-field radiation electrode portion. The radio IC chip rectifies an RF signal in a first frequency band and outputs and supplies power to the second RFID tag radio IC.

5 Claims, 10 Drawing Sheets

(51) Int. Cl.
*H01Q 21/00* (2006.01)
*G06K 19/077* (2006.01)
*G06K 19/07* (2006.01)
*H01Q 1/22* (2006.01)
*H01Q 1/24* (2006.01)
*H01Q 7/00* (2006.01)
*H01Q 9/28* (2006.01)
*H01Q 5/35* (2015.01)

(52) U.S. Cl.
CPC .... *G06K19/07756* (2013.01); *G06K 19/07767* (2013.01); *G06K 19/07779* (2013.01); *G06K 19/07783* (2013.01); *H01Q 1/2225* (2013.01); *H01Q 1/248* (2013.01); *H01Q 5/35* (2015.01); *H01Q 7/00* (2013.01); *H01Q 9/285* (2013.01); *G06K 19/0724* (2013.01)

(56) References Cited

U.S. PATENT DOCUMENTS

| | | | | |
|---|---|---|---|---|
| 6,837,438 | B1* | 1/2005 | Takasugi | G06K 19/0723 235/492 |
| 7,119,693 | B1* | 10/2006 | Devilbiss | G06K 7/0008 340/572.5 |
| 2002/0162894 | A1* | 11/2002 | Kuramochi | G06K 7/10178 235/492 |
| 2005/0001031 | A1* | 1/2005 | Akiho et al. | 235/451 |
| 2005/0007296 | A1* | 1/2005 | Endo | G06K 19/0726 343/895 |
| 2006/0054710 | A1* | 3/2006 | Forster et al. | 235/492 |
| 2011/0127337 | A1* | 6/2011 | Ikemoto | H01Q 1/243 235/492 |

* cited by examiner

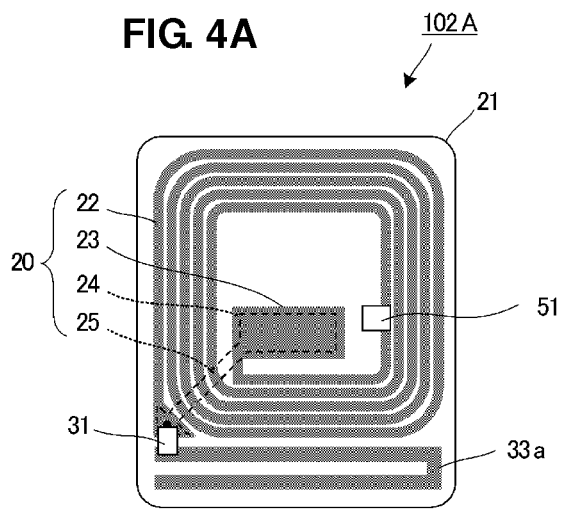
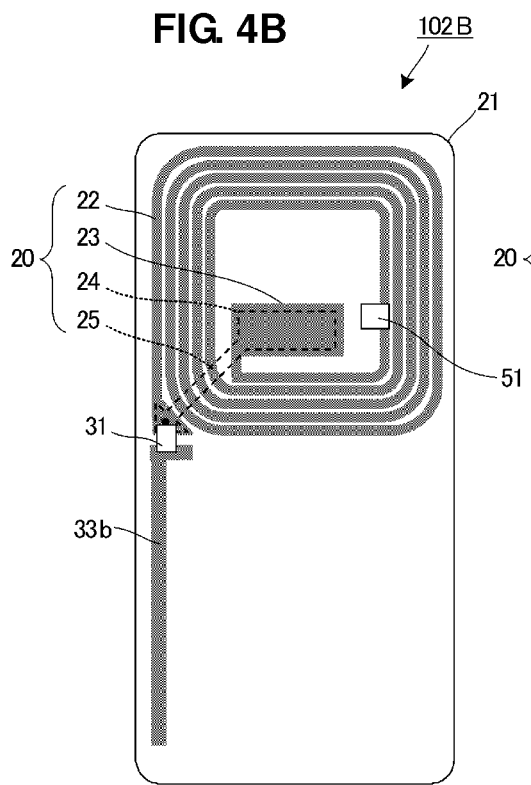
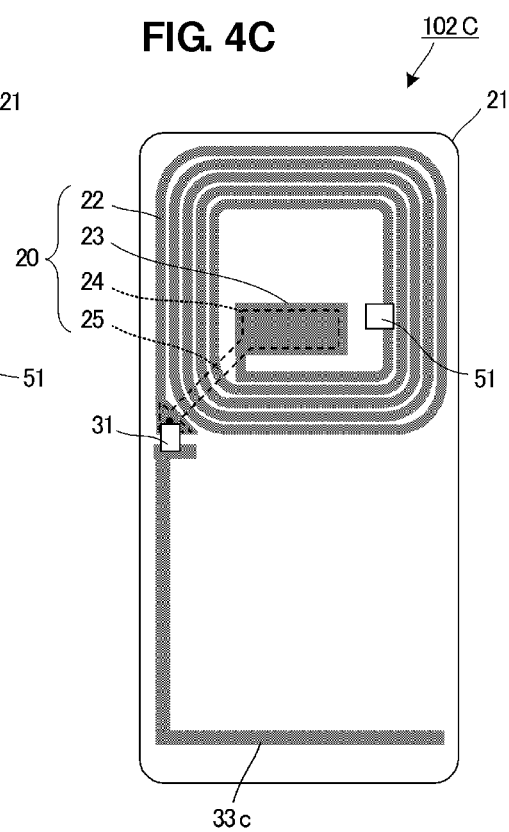

RADIO IC DEVICE

BACKGROUND OF THE INVENTION

1. Field of the Invention

The present invention relates to radio IC devices, and more particularly, to a radio IC device preferably for use in a radio-frequency identification (RFID) system for noncontact data communication using electromagnetic waves.

2. Description of the Related Art

Recently, RFID systems for transmitting information by noncontact communication between a reader/writer that generates an induction field and an RFID tag attached to an article and storing predetermined information have been used as article management systems.

Japanese Unexamined Patent Application Publication No. 2005-252853 discloses an RFID antenna that transmits and receives frequencies used in RFID, such as 13.56 MHz, 950 MHz, and 2.45 GHz.

FIG. 1 is a diagram showing the configuration of a noncontact IC tag that includes the RFID antenna of Japanese Unexamined Patent Application Publication No. 2005-252853. As shown in FIG. 1, antenna portions 111, 112, and 113 and land portions 103a and 103b are formed on a base substrate 102 made of, for example, resin or paper. The antenna portion 111 is formed of a coil of conductive material. The antenna portion 112 is formed of two L-shaped conductors 112a and 112b arranged at a predetermined distance from each other so as to surround the antenna portion 111. The antenna portion 113 is formed of two conductors 113a and 113b arranged at a predetermined distance outside the antenna portion 112. The land portions 103a and 103b are connected to the antenna portions 111 to 113. An IC chip 101 is mounted on the land portions 103a and 103b.

However, an RFID antenna having the structure as shown in Japanese Unexamined Patent Application Publication No. 2005-252853, has a problem in that the antenna size is relatively large because three different antennas must be provided on the same substrate. Another problem is that, if a plurality of antennas are disposed in close proximity and one of them is used for radio communication, the other antennas interfere with the communication, thus leading to unstable communication.

SUMMARY OF THE INVENTION

To overcome the problems described above, preferred embodiments of the present invention provide a radio IC device that receives and transmits RF signals in a plurality of frequency bands for RFID tags and that is compact and has superior radiation characteristics.

A radio IC device according to a preferred embodiment of the present invention preferably includes a radiation electrode, a first radio IC electrically connected or electromagnetically coupled to the radiation electrode and arranged to receive an RF signal for an RFID tag, and a second radio IC electrically connected or electromagnetically coupled to the radiation electrode and arranged to transmit and receive an RF signal for an RFID tag, wherein the first radio IC includes a circuit arranged to rectify the RF signal and to supply power to the second radio IC.

This configuration allows power reception and communication using RF signals in a plurality of frequency bands for RFID tags, thus, enabling efficient communication.

The first radio IC and the second radio IC are preferably arranged in the same package, for example.

This reduces the packaging costs.

The first radio IC preferably receives an RF signal in a first frequency band and the second radio IC preferably transmits and receives an RF signal in a second frequency band, and the radiation electrode is preferably arranged to receive an RF signal in the first frequency band and to transmit and receive an RF signal in the second frequency band, for example.

This reduces the overall size of the radio IC device.

The first frequency band is preferably lower than the second frequency band, for example, and the radiation electrode preferably includes a magnetic-field radiation electrode portion having a resonant frequency higher than the first frequency band and being arranged to function as a magnetic-field radiation electrode for an RF signal in the first frequency band.

This configuration allows the magnetic-field radiation electrode to function as a magnetic-field antenna in the first frequency band and as an electric-field antenna in the second frequency band so as to avoid a deterioration in radiation characteristics due to interference between antennas so that a radio IC device with superior radiation characteristics is provided.

The magnetic-field radiation electrode portion is preferably used to receive an RF signal in the first frequency band and to transmit and receive an RF signal in the second frequency band, for example.

This configuration reduces the overall size of the radio IC device because the RFID tag antenna for the first frequency and the RFID tag antenna for the second frequency need not be separately provided.

The resonant frequency of the radiation electrode portion is preferably lower than the second frequency band, for example.

This configuration allows the radiation electrode to function as an equivalent single radiation electrode at the frequency for the second RFID tag, thus improving radiation characteristics as an RFID tag.

The radiation electrode preferably includes a line electrode and capacitor electrodes defining a capacitor between ends of the line electrode, for example.

This configuration reduces the resonant frequency per area occupied by the first RFID tag radiation electrode by combining the inductance L of the line electrode portion and the capacitance C of the capacitor electrode portion. Conversely, this configuration reduces the area occupied per predetermined resonant frequency. Thus, the overall size is reduced. In addition, if the frequency for the second RFID tag is about ten times or more the frequency for the first RFID tag, for example, the capacitor electrode portion has a very low impedance at the frequency for the second RFID tag so that the entire radiation electrode functions as a single radiation electrode extending in a planar shape at the frequency for the second RFID tag. This further improves the radiation characteristics as the second RFID tag.

The capacitor electrodes preferably include a first side electrode and a second side electrode disposed opposite each other with a dielectric layer therebetween in a thickness direction, for example, the line electrode preferably includes a spiral portion extending spirally around the capacitor electrodes, for example, the first side electrode is preferably electrically connected to an inner end of the spiral portion of the line electrode, for example, and a crossing line electrode is preferably provided so as to connect an outer end of the spiral portion of the line electrode and the second side electrode, for example.

This configuration enables the crossing line electrode portion to have a low impedance at the frequency for the second RFID tag so that the electrodes can be assumed to be equivalently connected together with the crossing line electrode portion despite the spiral shape of the line electrode portion, thus functioning as a radiation electrode with high radiation efficiency.

Preferably, the line electrode includes an electrode-removed region, the first radio IC is mounted so as to be connected between ends of the line electrode in the electrode-removed region, and the second radio IC is mounted so as to be connected to the crossing line electrode near the outer end of the line electrode, for example.

This configuration allows the crossing electrode portion and the capacitor electrode portion to have a very low impedance at the RFID frequency, thus improving the effect of the entire radiation electrode as a radiation electrode and improving the radiation characteristics of the RFID tag antenna.

Preferably, a pair of the radiation electrodes are provided, and the first and second radio ICs are electrically connected or electromagnetically coupled to the pair of radiation electrodes.

This configuration allows the pair of radiation electrodes to function as two first RFID tag radiation antennas for different frequencies, for example, as an RFID tag for different frequencies in the HF band. In addition, if the radio IC for the second RFID tag is mounted with the pair of radiation electrodes connected as a dipole antenna, they function as a relatively large radiation electrode for the RFID tag, thus achieving superior radiation characteristics.

Preferably, the radiation electrode further includes an electric-field radiation electrode portion paired with the magnetic-field radiation electrode portion to define an equivalent dipole antenna together with the magnetic-field radiation electrode portion, and the second radio IC is electrically connected or magnetically coupled to the magnetic-field radiation electrode portion and the electric-field radiation electrode portion, for example.

This configuration provides superior radiation characteristics.

Preferably, the capacitor electrodes are disposed inside the spiral portion of the line electrode, and the electric-field radiation electrode portion is disposed outside the spiral portion of the line electrode, for example.

This configuration prevents the radiation electrode from being shielded by the spiral line electrode portion, thus maintaining superior radiation characteristics.

Preferably, the first radio IC or the second radio IC is a radio IC chip electrically connected to the radiation electrode, for example.

This configuration reduces the overall size and thickness of the radio IC device because an extremely small radio IC portion can be configured.

Preferably, the first radio IC or the second radio IC is an electromagnetic coupling module including a feed circuit board having a matching circuit including at least one inductor and a radio IC chip mounted on a top surface of the feed circuit board and electrically connected to the matching circuit, for example.

This configuration eliminates a characteristic variation caused by a deviation in the mounting position of the radio IC and also improves matching with the radiation electrode, thereby increasing antenna efficiency.

Preferably, a battery or a capacitor arranged to accumulate the power output from the first radio IC may be further provided, for example.

This eliminates the need to simultaneously receive an RF signal in the first frequency band and transmit and receive an RF signal in the second frequency band. That is, power reception and communication can be performed at different times.

Accordingly, a reader/writer that uses the first frequency band and a reader/writer that uses the second frequency band can be independently provided.

Preferably, the radio IC device includes, for example, a sensor, and the first radio IC or the second radio IC includes a circuit arranged to transmit detection results from the sensor.

This configuration allows transmission and reception of sensor information.

Various preferred embodiments of the present invention enable power reception and communication using RF signals in a plurality of frequency bands for RFID tags, thus enabling efficient communication. In addition, the overall size of the radio IC device can be reduced because the radiation electrode functions as radiation electrodes for the first and second RFID frequencies, and accordingly, the RFID tag antenna for the first frequency and the RFID tag antenna for the second frequency need not be separately provided. Furthermore, the radiation electrode functions as a magnetic-field antenna for the first RFID tag and as an electric-field antenna for the second RFID tag so as to avoid a deterioration in radiation characteristics due to interference between antennas so that a radio IC device with superior radiation characteristics can be configured.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 4A to 4C are plan views of a radio IC device according to a second preferred embodiment of the present invention.

15B is a plan view showing the state in which an electrode pattern is provided on a substrate 21 defining a component of the radio IC device.

DETAILED DESCRIPTION OF THE PREFERRED EMBODIMENTS

First Preferred Embodiment

Figure 1:
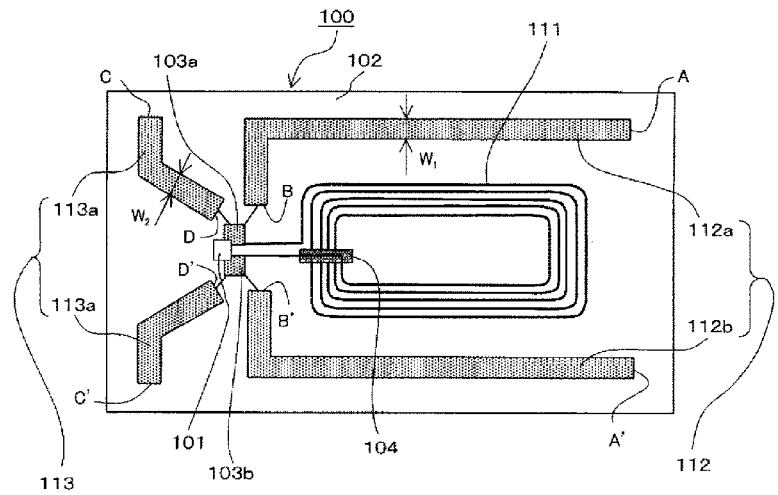
FIG. 1 is a diagram showing the configuration of an RFID tag shown of the related art.
Figure 2A:
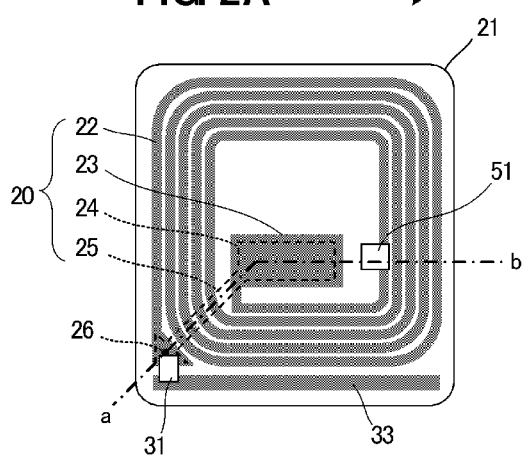
FIGS. 2A and 2B are a plan view and a sectional view, respectively, of a radio IC device according to a first preferred embodiment of the present invention.
Figure 2B:
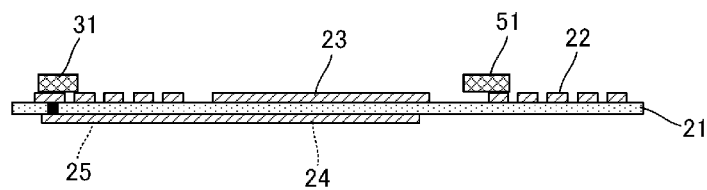
Figure 3A:
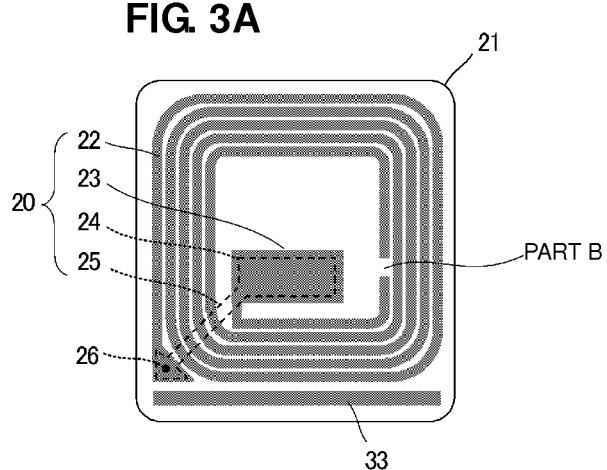
FIGS. 3A to 3C are diagrams illustrating the effects and advantages of the radio IC device as an RFID tag.
Figure 3B:
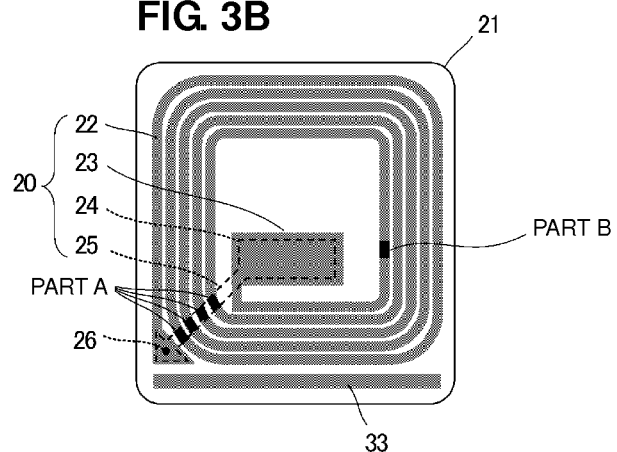
Figure 3C:
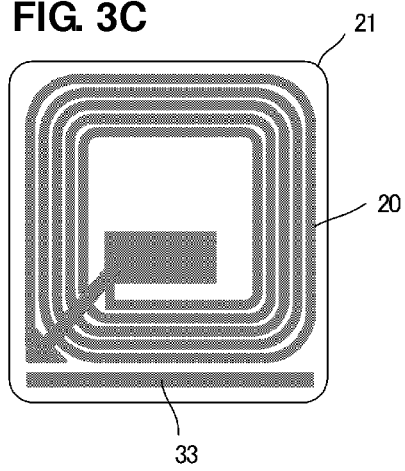

FIGS. 2A and 2B are diagrams showing the configuration of a radio IC device according to a first preferred embodiment of the present invention. FIG. 2A is a plan view thereof, and FIG. 2B is a sectional view of part a-b in FIG. 2A. In addition, FIGS. 3A to 3C are diagrams showing an electrode pattern on a substrate 21 and the operation thereof. This radio IC device 101 preferably includes various predetermined electrodes provided on the substrate 21 and RFID tag radio ICs 31 and 51, defined by IC chips, mounted on the substrate 21.

In FIGS. 2A and 2B, the radio IC device 101 preferably includes a desired electrode conductor pattern, such as copper or aluminum, for example, provided on the substrate 21, which is preferably made of a resin film, such as PET or PP, for example. Specifically, a resin sheet including copper or aluminum foil laminated thereto, for example, is preferably used, and the copper or aluminum foil is patterned by etching, for example.

As shown in FIGS. 2A and 2B, a spiral line electrode portion 22 and a first side electrode 23 connected to an inner end thereof are provided on a top surface of the substrate 21. A second side electrode 24 is provided on a bottom surface (backside) of the substrate 21 at a location opposite the first side electrode 23, and a crossing line electrode 25 is arranged so as to provide a bridge connection between the second side electrode 24 and a location opposite an outer end of the line electrode portion 22 (the position of a front-to-back connection portion 26) across the turns of the line electrode portion 22.

An end of the crossing line electrode 25 and the outer end of the line electrode portion 22 are preferably electrically connected with the front-to-back connection portion 26.

The first RFID tag radio IC 51 is preferably arranged so as to be inserted somewhere in the line electrode portion 22, for example.

In addition, a linear electric-field radiation electrode portion 33 is preferably provided on the top surface of the substrate 21. The second RFID tag radio IC 31 is preferably mounted with terminal electrodes thereof connected to the electric-field radiation electrode portion 33 near an end thereof and to the front-to-back connection portion 26.

The radio IC device 101 shown in FIGS. 2A and 2B functions as an RFID tag for a first frequency band (preferably, for example, the 13.56 MHz HF band) and as an RFID tag for a second frequency band (preferably, for example, the 900 MHz UHF band). The function as an RFID tag for the HF band is as follows.

Preferably, the line electrode portion 22 functions as a loop (spiral) magnetic-field radiation electrode and as an inductor in the spiral portion from the outer end to the inner end, and the first side electrode 23 and the second side electrode 24, disposed opposite each other with the substrate 21 therebetween, function as a capacitor. The line electrode portion 22, the electrodes 23 and 24 of the capacitor electrode portion, and the crossing line electrode 25 preferably define a magnetic-field radiation electrode portion 20. The inductor L and the capacitor C of the magnetic-field radiation electrode portion 20 preferably define an LC resonant circuit. The resonant frequency is preferably set to be higher than the frequency for the first RFID tag. Accordingly, the magnetic-field radiation electrode portion 20 is used below the resonant frequency, that is, the magnetic-field radiation electrode portion 20 operates inductively (magnetically), so that it functions as a magnetic-field radiation electrode at the frequency for the first RFID tag.

FIG. 3A shows a state before the first RFID tag radio IC 51 and the second RFID tag radio IC 31 are mounted. In FIG. 3A, part B is a region in which the first RFID tag radio IC 51 is to be mounted, and the first RFID tag radio IC 51 is mounted in the electrode-removed region of the line electrode portion 22, for example.

The first RFID tag radio IC 51 operates using a voltage occurring across the ends of the electrode-removed region of the line electrode portion 22 as a power supply and, at the same time, responds to an inquiry from a reader/writer by changing (modulating) the impedance connected between the ends of the electrode-removed region of the line electrode portion 22.

The second RFID tag radio IC 31 and the electric-field radiation electrode portion 33 do not affect the first RFID tag because they are arranged outside the closed circuit of the LC resonant circuit.

Next, the function as the second RFID tag will be described with reference to FIGS. 3A to 3C.

FIG. 3A shows the state before the mounting of the second RFID tag radio IC 31 and the first RFID tag radio IC 51. Some capacitance occurs between the crossing line electrode 25 and the line electrode portion 22 crossing it with the substrate 21 therebetween (parts A), although the impedance caused by the capacitance is extremely low in the second frequency band. Similarly, the impedance caused by the capacitance between the first side electrode 23 and the second side electrode 24 is extremely low in the RFID frequency band. In addition, the impedance of part B can be reduced and minimized by reducing the distance between the ends thereof to several hundreds of micrometers. Therefore, as shown in FIG. 3B, the line electrode portion 22, the electrodes 23 and 24 of the capacitor electrode portion, and the crossing line electrode 25 preferably function as a single continuous radiation electrode (electric-field radiation electrode) 20 in the frequency band of the RFID tag (preferably, for example, 900 MHz in the UHF band).

The resonant frequency of the single continuous radiation electrode 20 is preferably lower than the second frequency band, for example. Accordingly, the single continuous radiation electrode 20 preferably functions as an electric-field radiation electrode in the second frequency band. The single continuous radiation electrode 20 and the electric-field radiation electrode portion 33 preferably function as a dipole antenna.

The electric-field radiation electrode portion 33 preferably has a length approximately equal to one-quarter wavelength in the second frequency band, for example. Similarly, the single continuous radiation electrode 20 preferably has a line length equivalent to one-quarter wavelength in the second frequency band. However, the length or size of the electric-field radiation electrode portion 33 and the single continuous radiation electrode 20 is not limited to one-quarter wavelength, and may be any suitable size that enables them to function as a radiation electrode, particularly, a radiation electrode of a dipole antenna, in the second frequency band.

Comparing the first frequency band and the second frequency band, a relationship in which the second frequency band is about ten times or more the first frequency band is preferable. With such a frequency relationship, when the radio IC device 101 operates as the second RFID tag, the capacitances of parts A and B in FIG. 3B are on the order of several picofarads and result in low impedances on the order of several tens of ohms in the UHF band, thus providing the function as a single electrode shown in FIG. 3C with a directivity close to that of a dipole antenna.

With the configuration shown above, the radiation electrodes for the first and second RFID tags can advantageously be integrated. In addition, the area can be reduced because no distance is required between the radiation electrodes for the first and second RFID tags. Furthermore, a gain drop can be eliminated because there is no component equivalent to, for example, an HF-band RFID tag that would otherwise act as a shield blocking radiation from, for example, a UHF-band RFID tag.

The structure of the first side electrode 23 of the capacitor electrode portion and the second side electrode 24 of the capacitor electrode portion is not limited to the structure in which they are arranged opposite to each other with the substrate 21 therebetween. Instead, the first side electrode and the second side electrode may be arranged on one surface of the substrate with a dielectric layer formed therebetween.

Second Preferred Embodiment

FIGS. 4A to 4C are plan views of a radio IC device according to a second preferred embodiment of the present invention. As shown in FIGS. 2A and 2B, the linear electric-field radiation electrode portion 33 is preferably arranged along one side of the spiral line electrode portion 22 and one side of the substrate 21. FIGS. 4A to 4C differ from FIGS. 2A and 2B in the shape of the electric-field radiation electrode portion 33. In a radio IC device 102A in FIG. 4A, an electric-field radiation electrode portion 33a preferably has a folded shape so as to reciprocate along one side of the line electrode portion 22 and one side of the substrate 21, for example.

In a radio IC device 102B in FIG. 4B, an electric-field radiation electrode portion 33b preferably has a linear or substantially linear shape so as to extend along one side of the substrate 21 in a direction away from the magnetic-field radiation electrode portion 20, for example.

In a radio IC device 102C in FIG. 4C, an electric-field radiation electrode portion 33c preferably has a substantial L-shape so as to extend along two sides of the substrate 21, for example.

In FIGS. 4A to 4C, the structure and operation other than as described above are similar to those of the first preferred embodiment.

The structure shown in FIG. 4A enables the equivalent line length (electrical length) of the electric-field radiation electrode portion 33a to be extended without substantially increasing the area of the substrate 21 and therefore enables the area of the substrate 21 required to achieve the necessary frequency for the RFID tag to be reduced.

The structure in FIG. 4B increases radiation efficiency as a dipole antenna because the magnetic-field radiation electrode portion 20 and the electric-field radiation electrode portion 33b extend in directions away from each other. Accordingly, the sensitivity of the RFID tag is improved.

The structure in FIG. 4C increases sensitivity as an RFID tag while reducing in overall size because the area of the substrate 21 can be effectively utilized to define the electric-field radiation electrode portion 33c having the necessary line length (electrical length).

Third Preferred Embodiment

Figure 5:
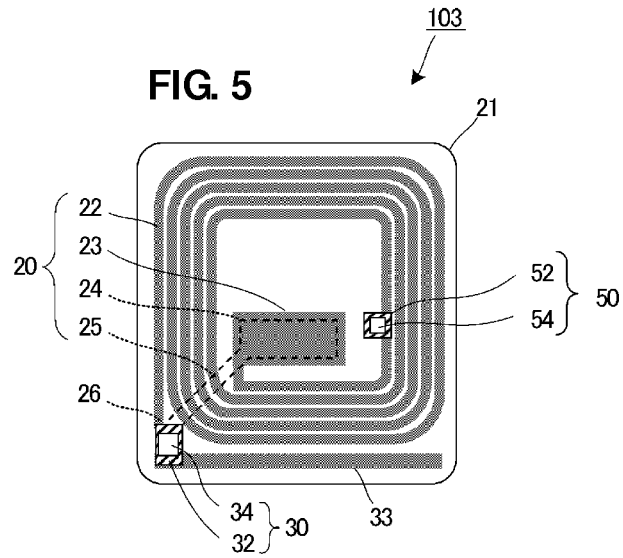
FIG. 5 is a plan view of a radio IC device according to a third preferred embodiment of the present invention.
Figure 6:
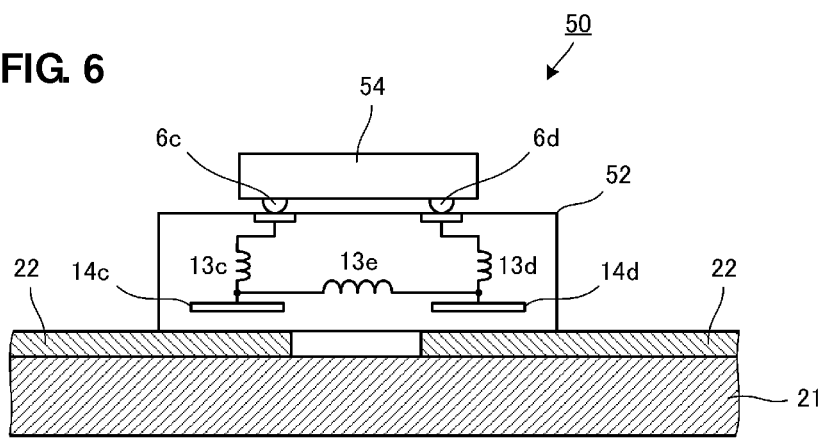
FIG. 6 is a sectional view of a first RFID tag electromagnetic coupling module used in the radio IC device according to the third preferred embodiment of the present invention.
Figure 7:
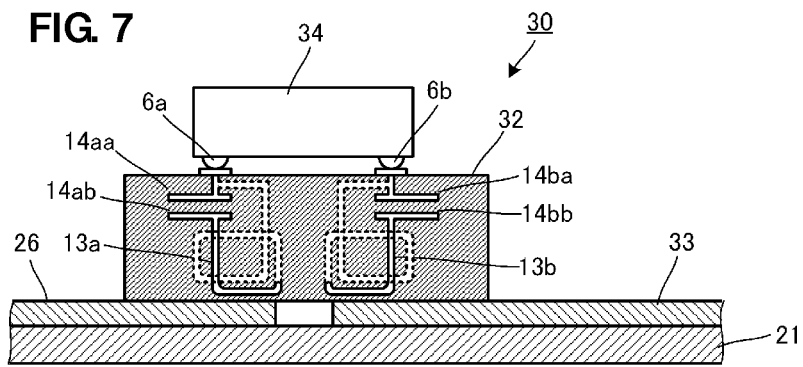
FIG. 7 is a sectional view of a second RFID tag electromagnetic coupling module used in the radio IC device according to the third preferred embodiment of the present invention.

FIG. 5 is a plan view of a radio IC device according to a third preferred embodiment of the present invention. FIG. 6 is a sectional view of a first RFID tag electromagnetic coupling module 50 used in the radio IC device 103. FIG. 7 is a sectional view of a second RFID tag electromagnetic coupling module 30 used in the radio IC device 103.

The first RFID tag electromagnetic coupling module 50 preferably includes a feed circuit board 52 and a radio IC chip 54 mounted thereon. The second RFID tag electromagnetic coupling module 30 preferably includes a feed circuit board 32 and a radio IC chip 34 mounted thereon. While the two connection terminals provided on the radio IC 51 are directly connected to the electrode-removed region of the magnetic-field radiation electrode portion 20 in the first and second preferred embodiments, the first RFID tag electromagnetic coupling module is preferably electromagnetically coupled to the magnetic-field radiation electrode portion 20 in the third preferred embodiment shown in FIG. 5. In addition, while the two connection terminals provided on the radio IC 31 are directly connected to the magnetic-field radiation electrode portion 20 and the electric-field radiation electrode portion 33 in the first and second preferred embodiments, the second RFID tag electromagnetic coupling module 30 is preferably electromagnetically coupled to the magnetic-field radiation electrode portion 20 and the electric-field radiation electrode portion 33 in the third preferred embodiment shown in FIG. 5.

As shown in FIG. 6, capacitor electrodes 14c and 14d and inductor conductors 13c, 13d, and 13e are provided inside the feed circuit board 52. Electrode pads are arranged on a top surface of the feed circuit board 52 so that the inductor conductors 13c and 13d are connected thereto, and solder bumps 6c and 6d on the radio IC chip 54 are bonded to the electrode pads.

The radio IC chip 54 preferably includes a circuit arranged to supply power to the solder bumps 6c and 6d. The inductor conductors 13c, 13d, and 13e define a matching circuit, and the capacitor electrodes 14c and 14d are capacitively coupled to the ends of the line electrode portion 22. In this manner, the radio IC chip 54 and the loop antenna are preferably impedance-matched and are capacitively coupled with a capacitance on the order of several picofarads, for example. This eliminates a characteristic variation due to a deviation in the mounting position of the radio IC and also improves matching with the radiation electrode for increased antenna efficiency. In addition, because the matching circuit performs matching at the frequency used for the first RFID tag, the frequency band can be widened without being affected by the resonant frequency of the magnetic-field radiation electrode portion 20.

As shown in FIG. 7, capacitor electrodes 14aa, 14ab, 14ba, and 14bb and inductor conductors 13a and 13b are preferably provided inside the feed circuit board 32. Electrode pads are arranged on a top surface of the feed circuit board 32 so that the capacitor electrodes 14aa and 14ba are connected thereto, and solder bumps 6a and 6b on the radio IC chip 34 are bonded to the electrode pads.

The radio IC chip 34 preferably includes a circuit arranged to supply power to the solder bump 6a and a circuit arranged to supply power to the solder bump 6b. Thus, a matching circuit is defined by an LC circuit including a capacitor defined between the capacitor electrodes 14aa and 14ab and an inductor defined by the inductor conductor 13a. The inductor conductors 13a and 13b are preferably magnetically coupled to the front-to-back connection portion 26 and the electric-field radiation electrode portion 33, respectively. In this manner, the radio IC chip 34 and the dipole antenna are impedance-matched and are electromagnetically coupled. This eliminates a characteristic variation due to a deviation in the mounting location of the radio IC and also improves matching with the radiation electrode so as to increase antenna efficiency. In addition, because the matching circuit performs matching at the frequency used for the second RFID tag, the frequency band can be widened without being affected by the resonant frequency of the antenna defined by the magnetic-field radiation electrode portion 20 and the electric-field radiation electrode portion 33.

When the radio IC device 103 operates as the first RFID tag (HF-band RFID tag), a capacitance of several picofarads, for example, between the second RFID tag electromagnetic coupling module 30 and the front-to-back connection portion 26 results in a high impedance of about 10 kΩ, for example. Thus, the second RFID tag electromagnetic coupling module 30 and the electric-field radiation electrode portion 33 do not substantially affect the resonant frequency of the first RFID tag (HF-band RFID tag).

On the other hand, the second RFID tag electromagnetic coupling module 30 is designed so that, when the radio IC device 103 operates as the second RFID tag (UHF-band RFID tag), capacitances of several picofarads, for example, between the second RFID tag electromagnetic coupling module 30 and the front-to-back connection portion 26, and between the second RFID tag electromagnetic coupling module 30 and the electric-field radiation electrode portion 33, respectively, and the matching circuits inside the second RFID tag electromagnetic coupling module 30 enable impedance matching between the radio IC chip 34 and the magnetic-field radiation electrode portion 20 and the electric-field radiation electrode portion 33.

The frequency of signals transmitted and received by the magnetic-field radiation electrode portion 20 and the electric-field radiation electrode portion 33 can be substantially determined by the LC circuits of the feed circuit board 32.

Thus, the use of the electromagnetic coupling modules 30 and 50 eliminates the need to set the length and electrode distance, for example, of the radiation electrode depending on frequency, and therefore, enables the radiation electrode to have various shapes, thus improving the design flexibility in terms of radiation characteristics. In addition, because the feed circuit boards need only to be mounted at locations at which they can be electromagnetically coupled to the radiation electrode, the mounting accuracy can be reduced.

Fourth Preferred Embodiment

Figure 8:
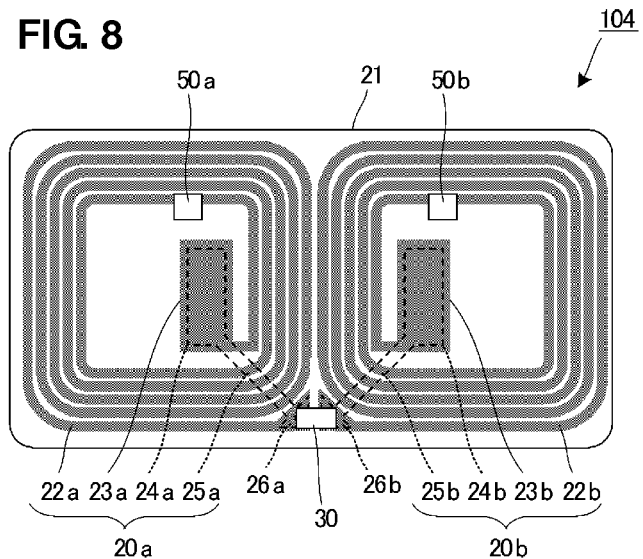
FIG. 8 is a plan view of a radio IC device according to a fourth preferred embodiment of the present invention.

FIG. 8 is a plan view of a radio IC device according to a fourth preferred embodiment of the present invention. The radio IC device 104 according to the fourth preferred embodiment preferably includes two magnetic-field radiation electrode portions 20a and 20b.

Two spiral line electrode portions 22a and 22b and first side electrodes 23a and 23b connected to inner ends thereof, for example, are preferably provided on the top surface of the substrate 21. In addition, second side electrodes 24a and 24b are preferably provided on the bottom surface of the substrate 21 at locations opposite to the first side electrodes 23a and 23b, respectively, and crossing line electrodes 25a and 25b are preferably arranged so as to provide bridge connections between the second side electrodes 24a and 24b and front-to-back connection portions 26a and 26b across the line electrode portions. Ends of the crossing line electrodes 25a and 25b and outer ends of the line electrode portions 22a and 22b are electrically connected with the front-to-back connection portions 26a and 26b.

First RFID tag electromagnetic coupling modules or radio IC chips 50a and 50b are preferably mounted at a location along the line electrode portions 22a and 22b, respectively.

The magnetic-field radiation electrode portion 20a, defined by the line electrode portion 22a, the electrodes 23a and 24a, and the crossing line electrode 25a, preferably functions as a resonant circuit for one first RFID tag, and the magnetic-field radiation electrode portion 20b, defined by the line electrode portion 22b, the electrodes 23b and 24b, and the crossing line electrode 25b, preferably functions as a resonant circuit for another first RFID tag.

In addition, a second RFID tag electromagnetic coupling module 30 is preferably mounted with connection terminals thereof connected to the front-to-back connection portions 26a and 26b.

As in the preferred embodiments described above, the two magnetic-field radiation electrode portions 20a and 20b function as electric-field radiation electrodes in the second frequency band, and the length or size thereof is approximately equivalent to one-quarter wavelength in the second frequency band. This is equivalent to a structure in which a dipole antenna is connected to the second RFID tag electromagnetic coupling module 30.

This structure enables the radio IC device 104 to be used as an RFID tag for two HF bands having different frequencies.

In addition, this structure further improves the radiation characteristics of the second RFID tag because the two magnetic-field radiation electrode portions 20a and 20b have good symmetry.

Fifth Preferred Embodiment

Figure 9:
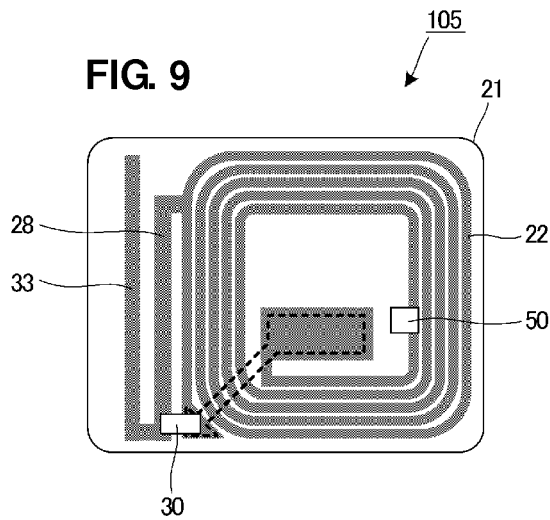
FIG. 9 is a plan view of a radio IC device according to a fifth preferred embodiment of the present invention.

FIG. 9 is a plan view of a radio IC device 105 according to a fifth preferred embodiment of the present invention. In this example, a line-electrode extending portion 28 extends from a location along the line electrode portion 22 so that the impedance of the region in which the electromagnetic coupling module 30 is mounted is inductive (L). That is, the impedance is not capacitive but inductive because a portion of the line electrode portion 22 and the line-electrode extending portion 28 define a loop as viewed from the region in which the electromagnetic coupling module 30 is mounted.

This facilitates impedance matching with the capacitive electromagnetic coupling module 30.

Sixth Preferred Embodiment

Figure 10:
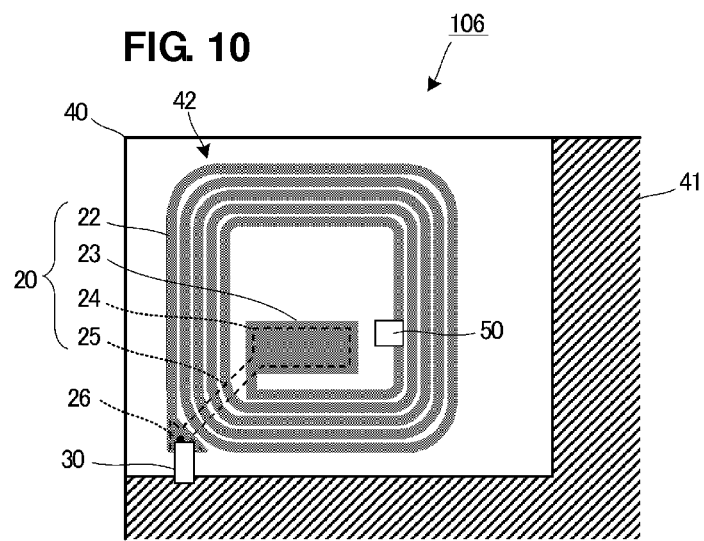
FIG. 10 is a partial plan view of a radio IC device according to a sixth preferred embodiment of the present invention.

FIG. 10 is a partial plan view of a radio IC device according to a sixth preferred embodiment of the present invention. While the radio IC device according to any of the first to fifth preferred embodiments is provided on a sheet-shaped substrate and is used by, for example, bonding it to an article, the radio IC device 106 according to the sixth preferred embodiment is configured on a mounting substrate of, for example, a terminal device (i.e., a cellular phone) for a mobile communication system, for example.

In FIG. 10, a non-ground region 42 in which a ground electrode 41 is not provided is preferably provided at an end of a mounting substrate 40, and a spiral line electrode portion 22 and a first side electrode 23 extending from an inner end thereof are provided on a top surface of the non-ground region 42. A second side electrode 24 is preferably provided on a bottom surface (backside) of the non-ground region 42 at a location opposite to the first side electrode 23, and a crossing line electrode 25 is preferably arranged so as to provide a bridge connection between the second side electrode 24 and a location opposite an outer end of the line electrode portion 22 (i.e., the location of a front-to-back connection portion 26) across the turns of the line electrode portion 22. An end of the crossing line electrode 25 and the outer end of the line electrode portion 22 are preferably electrically connected with the front-to-back connection portion 26.

A first RFID tag electromagnetic module 50 is preferably arranged so as to be inserted at a location in the line electrode portion 22. The line electrode portion 22 and the electrodes 23 and 24 function as a radiation electrode of a first RFID tag.

An electromagnetic coupling module 30 is preferably arranged so as to be connected to the front-to-back connection portion 26 and the ground electrode 41. A magnetic-field radiation electrode portion 20 defined by the line electrode portion 22, the electrodes 23 and 24, and the crossing line electrode 25 and the ground electrode 41 function as a radiation electrode for a second RFID tag. That is, one terminal electrode of the second RFID tag electromagnetic coupling module 30 is preferably connected to the magnetic-field radiation electrode portion 20, and the other terminal electrode is preferably connected to the ground electrode 41, so that they function as a monopole antenna as a whole.

This structure can be provided on, for example, a mounting substrate of a cellular phone, and eliminates the need to provide another radiation electrode to define a dipole antenna, thus reducing the overall area occupied by the radio IC device.

The radio IC device according to the fourth or fifth preferred embodiment may preferably be provided on the top surface of the non-ground region 42 of the mounting substrate, for example.

Seventh Preferred Embodiment

Figure 11:
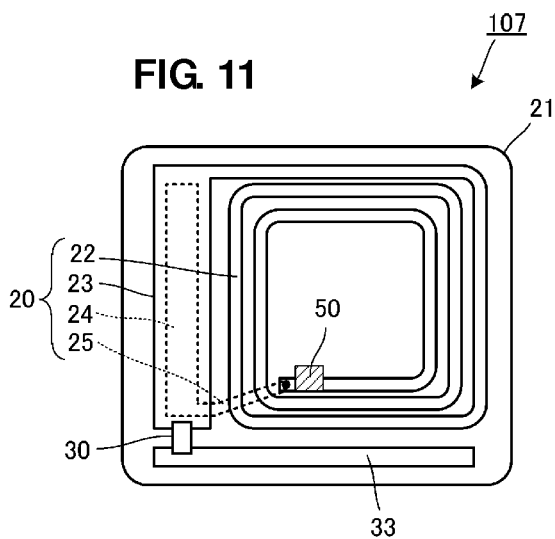
FIG. 11 is a plan view of a radio IC device according to a seventh preferred embodiment of the present invention.

FIG. 11 is a plan view of a radio IC device according to a seventh preferred embodiment of the present invention. While the capacitor electrode portion is arranged inside the spiral line electrode portion in the first to sixth preferred embodiments, the capacitor electrode portion is preferably arranged outside the spiral line electrode portion in the seventh preferred embodiment shown in FIG. 10. Specifically, a spiral line electrode portion 22 and a first side electrode 23 extending from an outer end thereof are preferably provided on the top surface of the substrate 21. A second side electrode 24 is preferably provided on the bottom surface of the substrate 21 at a location opposite to the first side electrode 23, and a crossing line electrode 25 is arranged so as to extend from the second side electrode 24 to a location opposite an inner end of the line electrode portion 22. An end of the crossing line electrode 25 and the inner end of the line electrode portion 22 are preferably electrically connected from front to back, for example. With this configuration, a magnetic-field radiation electrode portion 20 defined by the line electrode portion 22, the electrodes 23 and 24, and the crossing line electrode 25 functions as a resonant circuit for a first RFID tag.

In addition, an electric-field radiation electrode portion 33 is provided on the top surface of the substrate 21, and a second RFID tag electromagnetic coupling module 30 is preferably mounted with terminal electrodes thereof connected to an end of the electric-field radiation electrode portion 33 and the first side electrode 23.

With this structure, the magnetic-field radiation electrode portion 20 can be considered as a single continuous electrode in the frequency band of the RFID tag, thus functioning as a radiation electrode, because both a capacitance produced between the opposing locations of the line electrode portion 22 and the crossing line electrode 25 and a capacitance produced between the opposing positions of the electrodes 23 and 24 result in very low impedances in the frequency band of the RFID tag. In this case, the effect as a uniform metal-plate-shaped radiation electrode is improved because the radio IC is mounted near the crossing line electrode 25 and the electrodes 23 and 24.

Eighth Preferred Embodiment

Figure 12:
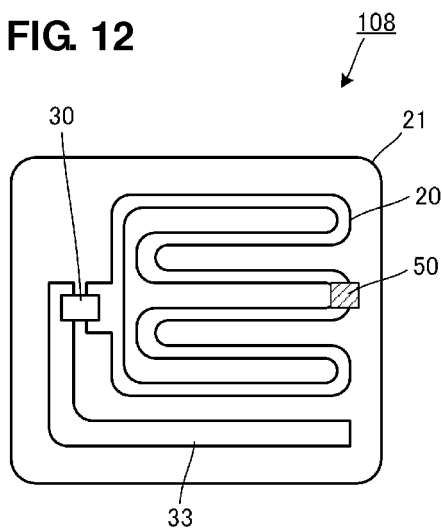
FIG. 12 is a plan view of a radio IC device according to an eighth preferred embodiment of the present invention.

FIG. 12 is a plan view of a radio IC device according to an eighth preferred embodiment of the present invention. A magnetic-field radiation electrode portion 20 is provided on the top surface of the substrate 21 preferably in a substantial loop shape as a whole and in a meandering shape locally, for example. In addition, an L-shaped electric-field radiation electrode portion 33, for example, is provided on the top surface of the substrate 21.

A first RFID tag electromagnetic coupling module 50 is preferably mounted at a location in the magnetic-field radiation electrode portion 20. In addition, a second RFID tag electromagnetic coupling module 30 is preferably mounted between an end of the electric-field radiation electrode portion 33 and a portion of the magnetic-field radiation electrode portion 20, for example. The magnetic-field radiation electrode portion 20 functions as a loop antenna for a first RFID tag. In the second frequency band, the magnetic-field radiation electrode portion 20 is equivalent or substantially equivalent to a uniform metal-plate-shaped radiation electrode so that the magnetic-field radiation electrode portion 20 and the electric-field radiation electrode portion 33 function as a dipole antenna for a second RFID tag.

Because the magnetic-field radiation electrode portion 20 is not arranged in a spiral configuration, but instead, is a closed loop in the same plane, the magnetic-field radiation electrode portion 20 can be provided on only one side of the substrate 21.

Ninth Preferred Embodiment

Figure 13A:
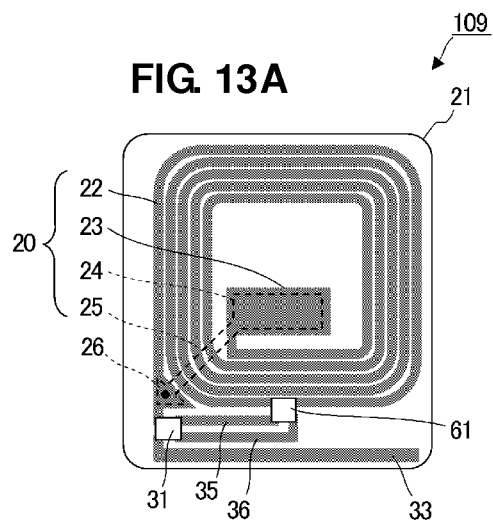
FIGS. 13A and 13B are plan views of a radio IC device according to a ninth preferred embodiment of the present invention.
Figure 13B:
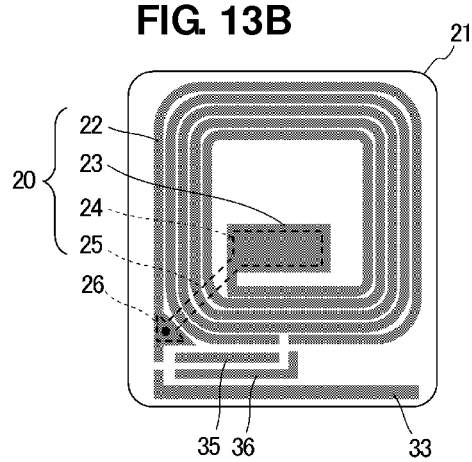

FIG. 13A is a plan view of a radio IC device 109 according to a ninth preferred embodiment of the present invention. FIG. 13B is a plan view showing a state in which an electrode pattern is provided on a substrate 21 defining a component of the radio IC device 109. In the radio IC device 109, an RFID tag radio IC 31 and a first radio IC chip 61, defined by IC chips, are preferably mounted on the substrate 21.

As shown in FIGS. 13A and 13B, a spiral line electrode portion 22 and a first side electrode 23 connected to an inner end thereof are preferably provided on a top surface of the substrate 21. A second side electrode 24 is preferably provided on a bottom surface (backside) of the substrate 21 at a location opposite to the first side electrode 23, and a crossing line electrode 25 is preferably arranged so as to provide a bridge connection between the second side electrode 24 and a location opposite to an outer end of the line electrode portion 22 (the position of a front-to-back connection portion 26) across the turns of the line electrode portion 22.

An end of the crossing line electrode 25 and the outer end of the line electrode portion 22 are electrically connected with the front-to-back connection portion 26.

The first radio IC chip 61 is preferably arranged so as to be inserted at a location in the line electrode portion 22.

In addition, a linear electric-field radiation electrode portion 33 is provided on the top surface of the substrate 21. The second RFID tag radio IC 31 is preferably mounted with terminal electrodes thereof connected to the electric-field radiation electrode portion 33 near an end thereof and to the front-to-back connection portion 26.

The radio IC device 109 shown in FIGS. 13A and 13B preferably functions to receive an RF signal in a first frequency band (for example, the 13.56 MHz HF band) as power and functions as an RFID tag to transmit and receive an RF signal in a second frequency band (for example, the 300 MHz or 900 MHz UHF band).

The line electrode portion 22 preferably functions as a loop (spiral) magnetic-field radiation electrode and as an inductor in the spiral portion from the outer end to the inner end and the first side electrode 23 and the second side electrode 24, arranged opposite to each other with the substrate 21 therebetween, preferably function as a capacitor. The line electrode portion 22, the electrodes 23 and 24 of the capacitor electrode portion, and the crossing line electrode 25 define a magnetic-field radiation electrode portion 20. The inductor L and the capacitor C of the magnetic-field radiation electrode portion 20 define an LC resonant circuit. This magnetic-field radiation electrode portion 20 preferably functions as an antenna arranged to receive as power an RF signal in the first frequency band.

The first radio IC chip 61 rectifies a voltage occurring across the ends of an electrode-removed region of the line electrode portion 22 and supplies the power to the RFID tag radio IC 31 via power supply lines 35 and 36. The first radio IC chip 61 may preferably be a simple rectifier.

The RFID tag radio IC 31 is a radio IC arranged to enable the radio IC device 109 to function as an RFID. The RFID tag radio IC 31 operates using the voltage applied between the power supply lines 35 and 36 as a power supply. Thus, the radio IC device 109 functions as an RFID using the first frequency band by receiving power from the first radio IC chip 61. The radio IC device 109 also functions as an RFID tag using both the first frequency band and the second frequency band by receiving power from the first radio IC chip 61 and by the second RFID tag radio IC 31 which receives power from an electromagnetic field. The RFID tag radio IC 31 transmits and receives an RF signal in the second frequency band using the magnetic-field radiation electrode portion 20 and the electric-field radiation electrode portion 33 as a dipole antenna.

The mechanism by which the magnetic-field radiation electrode portion 20 and the electric-field radiation electrode portion 33 function as a dipole antenna in the second frequency band is substantially the same as that described in the first preferred embodiment.

While the first radio IC chip 61 is preferably directly connected to the line electrode portion 22 in the ninth preferred embodiment, an electromagnetic coupling module, such as the electromagnetic coupling module 50 shown in FIG. 5, may be provided instead. Similarly, the second RFID tag radio IC 31 may be an electromagnetic coupling module. However, the supply voltage is supplied as a direct current.

In this manner, a large power can be received in the lower first frequency band so that the radio IC device 109 can efficiently function as an RFID tag.

Tenth Preferred Embodiment

Figure 14:
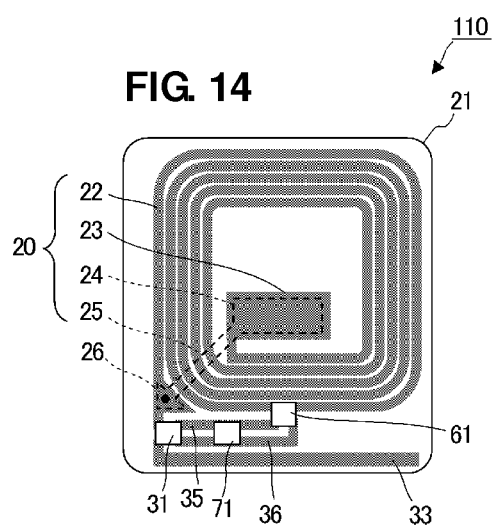
FIG. 14 is a plan view of a radio IC device according to a tenth preferred embodiment of the present invention.

FIG. 14 is a plan view of a radio IC device 110 according to a tenth preferred embodiment of the present invention. Unlike the radio IC device 109 in the ninth preferred embodiment shown in FIG. 13A, a capacitor 71 is preferably connected in parallel between the power supply lines 35 and 36. Thus, the capacitor 71 smoothes and accumulates the power rectified by the first radio IC chip 61. Even if the power induced by the magnetic-field radiation electrode portion 20 decreases and the power output from the first radio IC chip 61 decreases accordingly, a stable supply voltage is supplied to the RFID tag radio IC 31 by the accumulation effect of the capacitor 71. The capacitance of the capacitor 71 is preferably determined depending on the necessary operating time of the RFID tag radio IC 31 with the magnetic-field radiation electrode portion 20 receiving no RF signal in the first frequency band.

The capacitor 71 may preferably be replaced with a rechargeable battery.

The radio IC device 110 according to the tenth preferred embodiment can perform transmission/reception in the second frequency band using the power accumulated in the first frequency band so that it can perform transmission/reception in the second frequency band without necessarily simultaneously receiving an RF signal in the first frequency band (HF band) and transmitting and receiving an RF signal in the second frequency band (UHF band). Accordingly, a reader/writer that uses the first frequency band and a reader/writer that uses the second frequency band can be independently provided. In addition, because RF signals in the first and second frequency bands are transmitted at different times, the transmission timings for the first and second frequency bands need not match each other, thus simplifying the control of the radio IC device.

Eleventh Preferred Embodiment

Figures 15A, 15B:
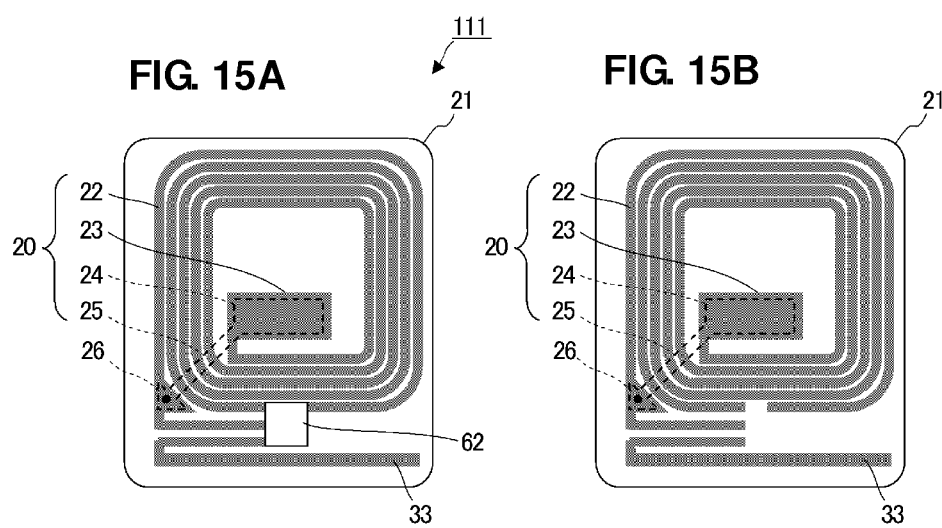
FIG. 15A is a plan view of a radio IC device according to an eleventh preferred embodiment of the present invention; FIG.

FIG. 15A is a plan view of a radio IC device 111 according to an eleventh preferred embodiment of the present invention. FIG. 15B is a plan view showing a state in which an electrode pattern is provided on a substrate 21 defining a component of the radio IC device 111.

Figure 15C:
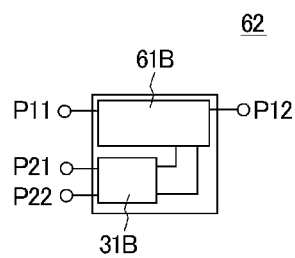
FIG. 15C is a diagram showing the internal configuration of a radio IC chip.

While the RFID tag radio IC 31 and the first radio IC chip 61 are separately mounted on the substrate 21 in the ninth preferred embodiment shown in FIG. 13, a single radio IC chip 62 is mounted in the eleventh preferred embodiment shown in FIGS. 15A to 15C. This radio IC chip 62 is preferably a one-chip radio IC chip including the function of the RFID tag radio IC 31 and the function of the first radio IC chip 61.

FIG. 15C is a diagram showing the internal configuration of the radio IC chip 62. The radio IC chip 62 preferably includes a functional section 31B that is equivalent to the RFID tag radio IC 31 and a functional section 61B that is equivalent to the first radio IC chip 61. Ports P11 and P12 are connected so as to be arranged at a location in the line electrode portion 22. A port P21 is preferably connected to a line leading to the front-to-back connection portion 26, and a port P22 is preferably connected to a line leading to the electric-field radiation electrode portion 33, for example.

The two functional sections may preferably be provided on a single semiconductor chip or may preferably be provided on different chips and accommodated in a single package.

Twelfth Preferred Embodiment

Figure 16A:
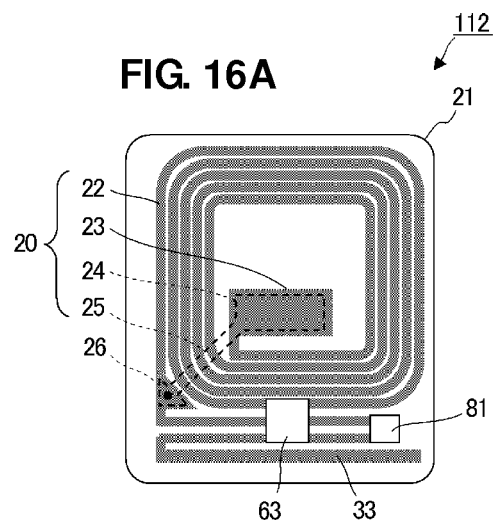
FIG. 16A is a plan view of a radio IC device according to a twelfth preferred embodiment of the present invention.

FIG. 16A is a plan view of a radio IC device 112 according to a twelfth preferred embodiment of the present invention. This radio IC device 112 preferably includes a radio IC chip 63 and a sensor chip 81. The sensor chip is, for example, a thermistor arranged to detect temperature, and the radio IC chip 63 is arranged to measure temperature using the sensor chip 81 and to transmit temperature information together with unique information on the RFID tag.

Figure 16B:
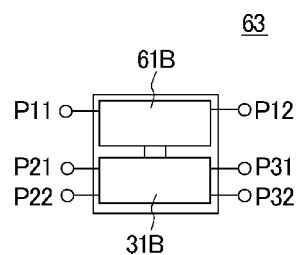
FIG. 16B is a diagram showing the internal configuration of a radio IC chip.

FIG. 16B is a diagram showing the internal configuration of the radio IC chip 63. An RFID tag radio IC functional section 31B measures temperature by directly or indirectly detecting the resistance of the sensor chip 81, which is connected to ports P31 and P32. The RFID tag radio IC functional section 31B then transmits information on the RFID tag and information on the measured temperature by an RF signal in the second frequency band.

Alternatively, the first radio IC functional section 61B may measure temperature by directly or indirectly detecting the resistance of the sensor chip 81. In addition, the first radio IC functional section 61B may transmit the information on the RFID tag and the information on the measured temperature by an RF signal in the first frequency band.

Thirteenth Preferred Embodiment

Figure 17:
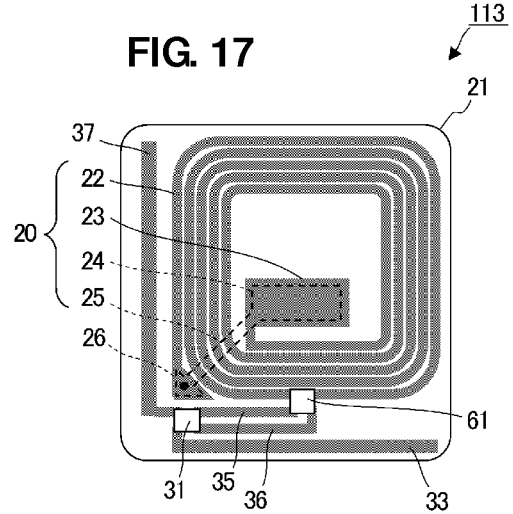
FIG. 17 is a plan view of a radio IC device according to a thirteenth preferred embodiment of the present invention.

FIG. 17 is a plan view of a radio IC device 113 according to a thirteenth preferred embodiment of the present invention. While the magnetic-field radiation electrode portion 20 is provided as one side of the dipole antenna in the second frequency band in the ninth preferred embodiment shown in FIG. 13A, the radio IC device 113 shown in FIG. 17 preferably includes electric-field radiation electrode portions 33 and 37 that function as a dipole antenna in the second frequency band.

Thus, the electric-field radiation electrode portions 33 and 37 arranged to transmit and receive an RF signal in the second frequency band are preferably provided independently from the magnetic-field radiation electrode portion 20 arranged to receive an RF signal in the first frequency band so that the antenna for the first frequency band and the antenna for the second frequency band can be independently set.

Fourteenth Preferred Embodiment

Figure 18:
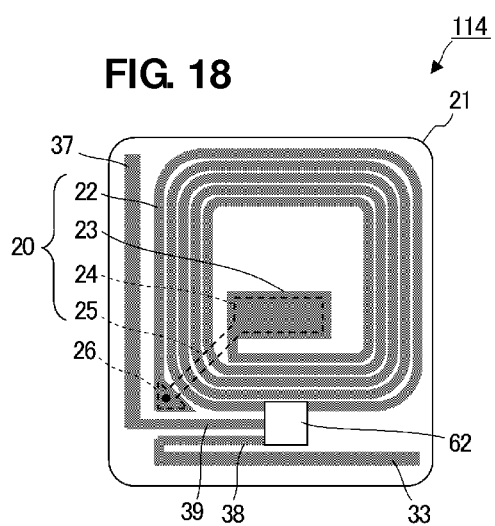
FIG. 18 is a plan view of a radio IC device according to a fourteenth preferred embodiment of the present invention.

FIG. 18 is a plan view of a radio IC device 114 according to a fourteenth preferred embodiment of the present invention. While the magnetic-field radiation electrode portion is used as one side of the dipole antenna in the second frequency band in the eleventh preferred embodiment shown in FIG. 15A, the radio IC device 114 shown in FIG. 18 preferably includes electric-field radiation electrode portions 33 and 37 arranged to function as a dipole antenna in the second frequency band.

Lines 38 and 39 between the radio IC chip 62 and the electric-field radiation electrode portions 33 and 37 function as an inductor, connected to the root of the dipole antenna, and arranged to match impedance and to set the resonant frequency.

Thus, the electric-field radiation electrode portions 33 and 37 arranged to transmit and receive an RF signal in the second frequency band are provided independently from the magnetic-field radiation electrode portion 20 arranged to receive an RF signal in the first frequency band so that the antenna for the first frequency band and the antenna for the second frequency band can be independently set.

Fifteenth Preferred Embodiment

Figure 19:
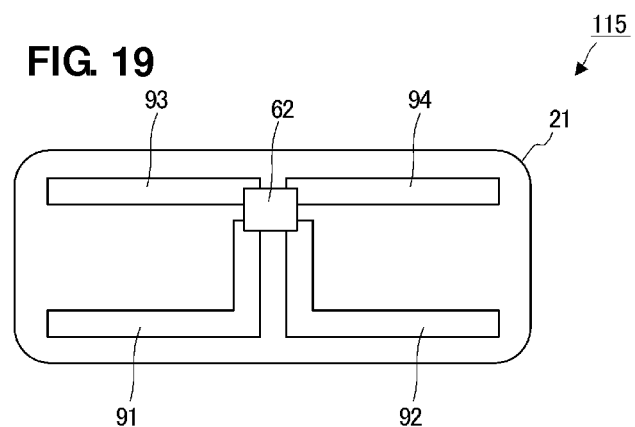
FIG. 19 is a plan view of a radio IC device according to a fifteenth preferred embodiment of the present invention.

FIG. 19 is a plan view of a radio IC device 115 according to a fifteenth preferred embodiment of the present invention. In the fifteenth preferred embodiment shown in FIG. 19, electric-field radiation electrode portions 91 and 92 preferably function as a first dipole antenna, and electric-field radiation electrode portions 93 and 94 preferably function as a second dipole antenna.

The configuration of the radio IC chip 62 is similar to that shown in FIG. 15(C, and it includes a functional section arranged to acquire power by receiving an RF signal in the first frequency band and a functional section arranged to function as an RFID tag by transmitting and receiving an RF signal in the second frequency band.

The first dipole antenna is used to receive an RF signal in the first frequency band, and the second dipole antenna is used to transmit and receive an RF signal in the second frequency band.

In this manner, each of the two antennas may be defined by an electric-field radiation electrode portion.

Although an RF signal in the first frequency band is preferably used to receive power in the ninth to fifteenth preferred embodiments, an RF signal in the second frequency band may preferably be used to receive power.

In addition, although the first and second frequency bands are preferably different in the ninth to fifteenth preferred embodiments, the first and second frequency bands may preferably be the same or substantially the same frequency band.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:
1. A radio IC device comprising:
a substrate;
a first radiation electrode provided on at least one main surface of the substrate;
a first radio IC and a second radio IC, the first radio IC being configured to transmit and receive an RF signal in a first frequency band, and the second radio IC being configured to transmit and receive an RF signal in a second frequency band; wherein
the first radio IC is connected to the first radiation electrode;
the first radiation electrode includes a line electrode and capacitor electrodes configured to define a capacitor between ends of the line electrode;
the capacitor electrodes include a first side electrode and a second side electrode arranged to oppose each other with a dielectric layer therebetween, the line electrode includes a spiral portion extending spirally around the capacitor electrodes, the first side electrode is connected to an inner end of the spiral portion of the line electrode; and
the substrate includes:
a crossing line electrode arranged to provide a connection between the second side electrode and an outer end of the spiral portion of the line electrode; and
a second radiation electrode paired with the first radiation electrode to define an equivalent dipole antenna together with the first radiation electrode, and the second radio IC is connected to both of the first radiation electrode and the second radiation electrode.

2. The radio IC device according to claim 1, wherein the line electrode includes an electrode-removed region, the first radio IC is connected to ends of the line electrode adjacent to the electrode-removed region, and the second radio IC is connected to the crossing line electrode in a vicinity of the outer end of the spiral portion of the line electrode.

3. The radio IC device according to claim 1, wherein the substrate further includes a pair of the first radiation electrodes, and the first and second radio ICs are electrically connected or electromagnetically coupled to the pair of the first radiation electrodes.

4. The radio IC device according to claim 1, wherein the first radiation electrode has a length equal or approximately equal to one-quarter wavelength in the second frequency band, and a resonant frequency of the first radiation electrode is lower than the second frequency band.

5. The radio IC device according to claim 1, wherein at least one of the first radio IC and the second radio IC includes an electromagnetic coupling module including a feed circuit board that includes a matching circuit including at least one inductor and a radio IC chip mounted on a top surface of the feed circuit board and electrically connected to the matching circuit.

* * * * *